United States Patent
Takekawa et al.

(10) Patent No.: US 9,661,644 B2
(45) Date of Patent: May 23, 2017

(54) WIRELESS COMMUNICATION SYSTEM

(71) Applicant: Hitachi Kokusai Electric Inc., Tokyo (JP)

(72) Inventors: Masayuki Takekawa, Tokyo (JP); Keigo Hasegawa, Tokyo (JP); Kei Yanagisawa, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 0 days.

(21) Appl. No.: 14/898,231

(22) PCT Filed: Mar. 28, 2014

(86) PCT No.: PCT/JP2014/059239
§ 371 (c)(1),
(2) Date: Dec. 14, 2015

(87) PCT Pub. No.: WO2014/185176
PCT Pub. Date: Nov. 20, 2014

(65) Prior Publication Data
US 2016/0135196 A1    May 12, 2016

(30) Foreign Application Priority Data

May 13, 2013 (JP) .................................. 2013-100934

(51) Int. Cl.
*H04W 72/08* (2009.01)
*H04W 16/14* (2009.01)
(Continued)

(52) U.S. Cl.
CPC ......... *H04W 72/082* (2013.01); *H04W 16/14* (2013.01); *H04W 72/0453* (2013.01)

(58) Field of Classification Search
CPC ....... H04W 16/14; H04W 4/18; H04W 84/12; H04W 72/02
(Continued)

(56) References Cited

U.S. PATENT DOCUMENTS

2010/0246506 A1* 9/2010 Krishnaswamy ... H04W 72/085
                                                              370/329
2011/0176445 A1* 7/2011 Chen ..................... H04L 5/0037
                                                              370/252
(Continued)

FOREIGN PATENT DOCUMENTS

WO    2012176632 A1    12/2012
WO    2014185176 A1    3/2014

OTHER PUBLICATIONS

International Search Report and Written Opinion from International Application No. PCT/JP2014/059239 mailed Jul. 1, 2014.

(Continued)

Primary Examiner — Charles C Jiang
Assistant Examiner — Will Lin
(74) Attorney, Agent, or Firm — Brundidge & Stanger, P.C.

(57) ABSTRACT

There is provided a wireless communication system that is capable of preventing interference with a primary use system caused by a CPE emitting radio waves at a frequency which is not a transmittable frequency before acquiring a list of transmittable frequencies based on its position information. In a wireless communication system that uses white space, a BS 10 and a CPE 22 store a specific frequency which is guaranteed to not interfere with a primary user. The BS 10 regularly switches between a first period when communication is performed at an operating frequency that uses white space and a second period when communication is performed at the specific frequency. In a case where whether the operating frequency is a transmittable frequency of the CPE 22 is not known, the CPE 22 performs communication with the base station at the specific frequency in the second period, and in a case where the operating frequency is recognized as the transmittable frequency, the CPE 22 performs communication at the operating frequency in the (Continued)

first period, and performs communication at the specific frequency in the second period.

5 Claims, 2 Drawing Sheets

(51) Int. Cl.
 *H04W 24/02* (2009.01)
 *H04W 72/04* (2009.01)
(58) Field of Classification Search
 USPC .............................. 455/509, 62, 456.1, 464
 See application file for complete search history.

(56) References Cited

U.S. PATENT DOCUMENTS

| 2012/0275354 | A1  | 11/2012 | Villain |              |
|--------------|-----|---------|---------|--------------|
| 2012/0302275 | A1* | 11/2012 | Junell  | H04W 48/18   |
|              |     |         |         | 455/514      |
| 2013/0155991 | A1* | 6/2013  | Kazmi   | H04W 72/0453 |
|              |     |         |         | 370/329      |
| 2014/0112215 | A1* | 4/2014  | Hasegawa| H04W 72/085  |
|              |     |         |         | 370/280      |
| 2014/0269550 | A1* | 9/2014  | Webb    | H04W 72/0446 |
|              |     |         |         | 370/329      |

OTHER PUBLICATIONS

K. Fujii., "Cognitive radio, a core technology for eliminating waste from radio while using white space", May 10, 2010, BusinessNetwork.jp, 9 pages, with English translation.

IEEE Computer Society, "IEEE Std 802.22-2011 Part 22: CognitiveWireless RAN Medium Access Control (MAC) and Physical Layer (PHY) Specifications: Policies and Procedures for Operation in the TV Band," Jul. 1, 2011.

* cited by examiner

WIRELESS COMMUNICATION SYSTEM

BACKGROUND OF THE INVENTION

Field of the Invention

The present invention relates to a wireless communication system that uses white space, and more particularly, to a wireless communication system that is capable of efficiently making secondary use of a frequency without interfering with primary users.

Description of the Related Art

Description of Prior Art

With the remarkable progress of information society in recent years, wireless communication is, in addition to wired communication, being used more and more often as a communication method for many information communication appliances and services. This has resulted in ever-increasing demand for radio frequencies, which are limited resources, and exhaustion of frequencies that can be allocated is becoming a problem around the world.

Generally, frequency license management is performed by the state, and only a licensee is allowed to use a frequency under strict management, at specific time and location. However, to cope with the demand for frequencies which is expected to continue growing, a new method, free from the past method, of using frequencies is wanted.

Accordingly, in recent years, as a new method of using frequencies for solving the problem of exhaustion of frequencies, a method of using frequencies that are already allocated but are spatially and temporally not used (white space) is being studied.

For example, a cognitive wireless communication system or the like in which a user without a license (hereinafter referred to as a "secondary user") flexibly uses radio waves in white space while sufficiently avoiding influencing use of frequencies by an existing system of a user with a license (hereinafter referred to as a "primary user") is being studied and developed (for example, Non-Patent Literature 1).

As the cognitive wireless communication system, there is a wireless regional area network (WRAN) that uses white space and that is standardized by IEEE 802.22, for example.

Such a system includes, on an IP network, a white space database (DB) and a coexistence manager (CM) (hereinafter referred to as "database or the like") for managing use of frequencies, and each wireless station acquires, by accessing the database or the like, a list of transmittable frequencies that is based on the position information of itself and the maximum allowed transmission power.

The list of transmittable frequencies is a list of frequencies at which wireless communication may be performed without interfering with primary users.

The list of transmittable frequencies is collectively managed while being updated as necessary by a spectrum manager (SM) of a base station (BS) to which a terminal (CPE: Customer Premises Equipment) such a slave station installed at a house or a mobile phone is connected.

Moreover, the BS determines the operating frequency of itself based on the list of transmittable frequencies.

Furthermore, each of the wireless stations (BS and CPE; the same applies in the following) may be provided with a spectrum sensing function.

When detecting by spectrum sensing that a determined use frequency is being used by an existing system (system of a primary user), the wireless station notifies the SM of the information. Then, the SM excludes the frequency from the list of transmittable frequencies, and notifies the database or the like to this effect.

A wireless communication system that uses white space avoids influencing the use of frequencies by primary users and also realizes communication by secondary users by performing dynamic spectrum access based on information that is updated from time to time in the above manner.

Incidentally, IEEE 802.22 does not clearly specify means used by a CPE not provided with the spectrum sensing function to grasp its transmittable frequency.

Now, generally, a CPE is not installed with a wireless interface other than a wireless interface for performing wireless communication with a BS (that is, an air interface of IEEE 802.22), and thus the CPE does not have means for connecting to an IP network (such as the Internet) other than a local area network without performing wireless communication with a BS.

Accordingly, when newly starting wireless communication that uses white space, a CPE has to emit radio waves to a BS before acquiring the list of transmittable frequencies that is provided by the database or the like based on the position information of the CPE.

In the case of a TDD (Time Division Duplex) system according to IEEE 802.22 or the like, the CPE and the BS have to perform wireless communication using the radio waves at the same frequency.

Therefore, a CPE about to newly perform wireless communication that uses white space performs, at the time of performing communication with a BS in order to grasp the transmittable frequency at the position of the CPE, transmission at a transmittable frequency of the BS.

Whether this frequency is a transmittable frequency for the CPE is unknown at this point, and there is a possibility that the frequency is not a transmittable frequency. Particularly, a CPE not provided with the spectrum sensing function cannot recognize use by a nearby primary user.

<Conventional Frequency Use Pattern: FIG. 5>

A frequency use pattern of a conventional wireless communication system will be described with reference to FIG. 5. FIG. 5 is a schematic explanatory diagram illustrating a frequency use pattern of a conventional wireless communication system.

In this case, CPEs 21 and 22 are present in a wireless communication system managed by a BS, and it is illustrated that the CPE 21 is already performing communication, and the CPE 22 is newly starting communication.

Furthermore, the BS is performing communication selecting f1 as the operating frequency from the list of transmittable frequencies presented to the spectrum manager, and the CPE 21 is already notified by the DB that f1 is the transmittable frequency.

Moreover, as illustrated in FIG. 5, with the conventional wireless communication system, the BS performs communication using the operating frequency f1 at all times, and thus it performs communication using the operating frequency f1 with not only the CPE 21 but also with the CPE 22 with which communication is to be newly started.

Here, since the CPE 22 is yet to acquire the list of transmittable frequencies from the DB via the BS, whether use of f1 is allowed is not known. That is, the CPE 22 is performing communication using the frequency f1 which may not be usable.

CITATION LIST

Non Patent Literature

Non Patent Literature 1: Koji Fujii, "Cognitive Wireless: Core technology for utilization of white space for eliminating unnecessary use of radio waves", (online), RIC Telecom, (searched on Jun. 9, 2011), Internet, http://businessnetwork.jp/tabid/65/artid/110/page/1/Default.aspx

SUMMARY OF THE INVENTION

As described above, according to a conventional wireless communication system that uses white space, a CPE not provided with the spectrum sensing function performs communication with a BS before acquiring the list of transmittable frequencies based on its position information from a database or the like.

At this time, the CPE receives a downlink signal from the BS, and performs transmission at the same frequency.

Accordingly, even when a frequency is allowed to the BS, if the CPE is located near a primary user, the primary user may be influenced if the CPE performs emission at the frequency.

That is, there is a problem that a CPE not provided with the sensing function possibly interferes with a primary user by emitting, in order to perform communication with a BS, before acquiring the list of transmittable frequencies based on its position information, radio waves at a frequency which is not a transmittable frequency.

The present invention has been made in view of the above circumstance, and an object thereof is to provide a wireless communication system that is capable of preventing a CPE from emitting radio waves at a frequency which is not a transmittable frequency before acquiring a list of transmittable frequencies based on its position information from a database or the like, and of preventing interference with a primary use system.

To achieve the above object, the present invention provides a wireless communication system for performing wireless communication between a base station and a terminal station by using white space, wherein the base station and the terminal station store information about a specific frequency that is guaranteed to not interfere with a primary user, the base station performs communication while regularly switching between a first period when communication is performed at an operating frequency that uses the white space and a second period when communication is performed at the specific frequency, and in a case where whether the operating frequency is a transmittable frequency that is based on position information of the terminal station is not recognized by the terminal station, the terminal station performs communication with the base station at the specific frequency in the second period, and in a case where the operating frequency is recognized as the transmittable frequency that is based on the position information of the terminal station, the terminal station performs communication with the base station at the operating frequency in the first period, and performs communication with the base station at the specific frequency in the second period.

In addition, in the wireless communication system of the present invention, the base station includes a data transmission unit for performing wireless communication at a specified frequency, and a frequency management unit storing information about the operating frequency that uses the white space and information about the specific frequency that is guaranteed to not interfere with a primary user, the frequency management unit being for regularly switching between, and instructing the data transmission unit of, the operating frequency and the specific frequency.

In the wireless communication system, the terminal station includes a data transmission unit for performing wireless communication at a specified frequency, and a used frequency control unit storing information about the specific frequency that is guaranteed to not interfere with a primary user, the used frequency control unit being for instructing, in a case where the transmittable frequency that is based on the position information of the terminal station is not recognized, the data transmission unit of the specific frequency.

According to the present invention, a wireless communication system performs wireless communication between a base station and a terminal station by using white space, where the base station and the terminal station store information about a specific frequency that is guaranteed to not interfere with a primary user, where the base station performs communication while regularly switching between a first period when communication is performed at an operating frequency that uses the white space and a second period when communication is performed at the specific frequency, and where, in a case where whether the operating frequency is a transmittable frequency that is based on position information of the terminal station is not recognized by the terminal station, the terminal station performs communication with the base station at the specific frequency in the second period, and in a case where the operating frequency is recognized as the transmittable frequency that is based on the position information of the terminal station, the terminal station performs communication with the base station at the operating frequency in the first period, and performs communication with the base station at the specific frequency in the second period, and thus effects are achieved that the terminal station may be prevented from emitting, before acquiring a list of transmittable frequencies that is based on its position information, radio waves at a frequency that is a transmittable frequency for the base station but not for the terminal station, and that interference with a primary user may be prevented.

DETAILED DESCRIPTION OF PREFERRED EMBODIMENTS

An embodiment of the present invention will be described with reference to the drawings.
<Summary of Embodiment>

According to a wireless communication system of an embodiment of the present invention, a base station and a terminal station store in advance a specific frequency which is guaranteed to not interfere with a primary user, the base station performs communication by regularly switching between a white space communication period when white space is used and a network entry period when communication is performed using the specific frequency, and a terminal station about to newly start communication that uses white space performs, in the network entry period, communication with the base station by using the specific frequency, and acquires a list of usable frequencies based on position information, where the terminal station about to newly start communication is prevented from emitting, before acquiring the list of transmittable frequencies based on its position information, radio waves at a frequency that cannot be used by the terminal station for transmission, and is prevented from interfering with primary users.

Figure 1:
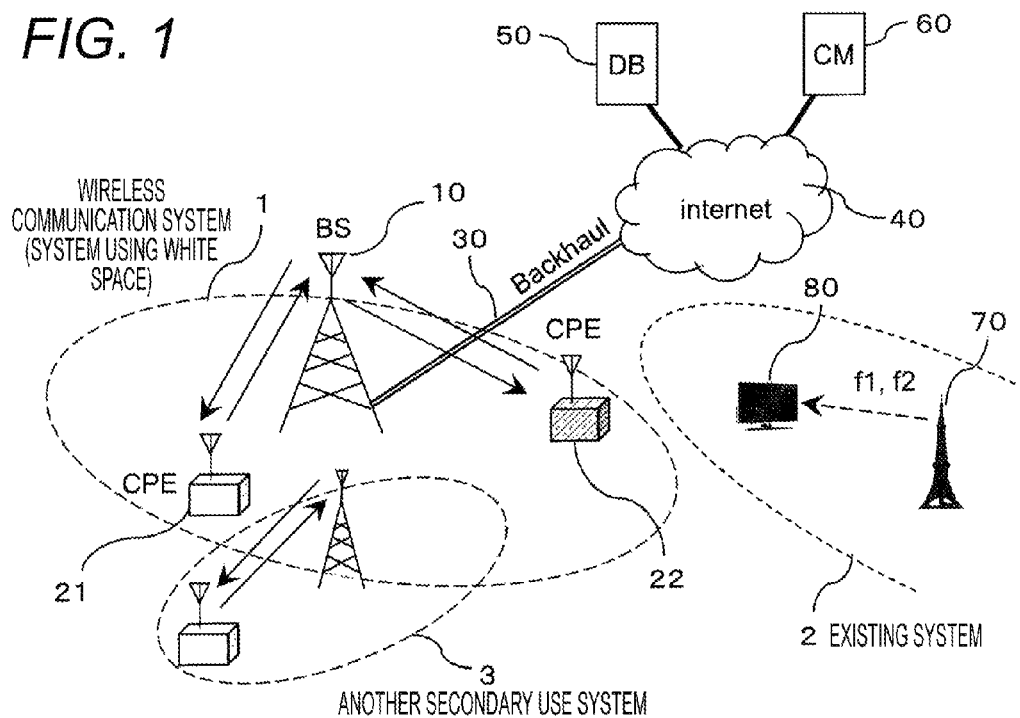
FIG. 1 is an explanatory diagram of an overall system including a wireless communication system according to an embodiment of the present invention.

<Wireless Communication System According to Embodiment: FIG. 1>

A configuration of the wireless communication system according to the embodiment of the present invention will be described with reference to FIG. 1. FIG. 1 is an explanatory diagram of an overall system including the wireless communication system according to the embodiment of the present invention.

As illustrated in FIG. 1, a wireless communication system (present system) 1 according to the embodiment of the present invention is a wireless communication system that uses white space, and is configured by including a CPE 21 and a CPE 22 which are wireless communication terminals (terminal stations) such as a slave station installed at a house and a mobile phone, a BS 10 which is a base station to which the wireless communication terminals are connected, a backhaul 30 of the BS 10, Internet 40, a white space database (DB) (hereinafter referred to as a "database") 50, and a white space coexistence manager (CM) (hereinafter referred to as the "coexistence manager") 60.

Furthermore, a communication system 2 of a primary user with a license for frequency usage (hereinafter such a system will be referred to as an "existing system") is configured by including a transmitting station 70 and a receiving station 80, and is assumed to be licensed and using frequencies f1 and f2.

In the following description, a secondary user without the usage licenses for the frequencies f1 and f2 is assumed to use the frequencies f1 and f2 as white space.

In the example in FIG. 1, as the secondary users, there are the present wireless communication system 1 and another secondary use system 3.

Each unit of the present system 1 will be described.
<Database (DB) 50>

The database 50 is for managing the usage status of frequencies, and stores, and provides to a secondary use system, information about frequencies (transmittable frequencies) that can be used for wireless communication without spatially and temporally influencing a primary use system.

<Coexistence Manager (CM) 60>

The coexistence manager 60 allocates a frequency in such a way that wireless communication is appropriately performed while avoiding interference between secondary use systems.

As illustrated in FIG. 1, even in a case where the other secondary use system 3 that uses white space is present within the service area of the wireless communication system 1, the wireless communication system 1 and the other secondary use system 3 may perform communication without interfering with each other by making secondary use of different frequencies.

For example, the coexistence manager 60 reconstructs the list of transmittable frequencies of each wireless station in such a way that the wireless communication system 1 and the other secondary use system 3 perform wireless communication by using the frequency f1 and the frequency f2, respectively.

<BS 10>

The BS 10 connects to the Internet 40 through the backhaul 30, acquires the list of usable frequencies by accessing the database 50 and the coexistence manager 60 on the Internet 40, determines the operating frequency, and performs communication with the CPEs 21 and 22 in the wireless communication system 1 at the operating frequency.

Furthermore, as a feature of the present system, the BS 10 stores, in advance, the value of a specific frequency which would not interfere with the primary user (existing system), that is, a specific frequency which is guaranteed to be not used by the primary user. The specific frequency will be referred to as a frequency for entry.

As the frequency for entry, a frequency in a band that is not continuous with the band of white space, such as an ISM (Industry-Science-Medical) band, or a white space frequency for which it is guaranteed that there are no primary users may be selected, or a specific TV channel in a UHF band may be allocated as the frequency for entry, for example.

Furthermore, propagation characteristics, allowed radiation power and the like of communication at the frequency for entry may be greatly different from the characteristics in white space.

Moreover, in the present system, the BS 10 has a period for performing communication at the frequency for entry as the period when communication with a CPE that is about to newly start communication that uses white space is to be performed using not the operating frequency but the frequency for entry. Details will be given later.

<CPEs 21, 22>

The CPEs 21 and 22 do not have the sensing function, and acquire the list of transmittable frequencies via the BS 10.

As a feature of the present system, in the case of newly starting communication that uses white space (at the time of new communication entry), the CPEs 21 and 22 perform communication with the BS 10 at the frequency for entry which is guaranteed to not interfere with the primary user (existing system) and acquire the list of transmittable frequencies based on their respective position information.

The CPEs 21 and 22 are thereby prevented, at the time of new communication entry when the CPEs 21 and 22 are yet to recognize the transmittable frequency based on the position information, from emitting radio waves at a frequency which may be used for transmission by the BS 10 but not by the CPEs 21 and 22, and the risk of interfering with the primary user may be avoided.

Moreover, the CPEs 21 and 22 may, like the BS 10, store in advance information about the frequency for entry, or may acquire the frequency for entry by searching for signals transmitted from the BS 10. In the case of acquisition by a search, the frequency range including the frequency for entry is stored in advance, a search is performed within this range and an acquired frequency is stored as the frequency for entry, and transmission is performed using this frequency.

Specifically, the range including the frequency for entry is set to the UHF band, for example, and is stored in advance in the BS 10, the BS 10 decides a specific frequency channel, among the channels in the UHF band, as the frequency for entry and transmits the frequency for entry, the value of the frequency for entry is also stored in the CPEs 21 and 22 as the initial information of the devices, and the CPEs 21 and 22 search for downlink signals from the BS at the frequency immediately after power activation.

Also, the CPEs 21 and 22 may hold a band including the frequency for entry, and may search for downlink signals from the BS 10 in the band immediately after power activation.

Additionally, there may be a plurality of frequencies for entry, and any of these is a frequency guaranteed to not influence the primary user.

<Schematic Operation of Present Wireless Communication System: FIG. 1>

An operation of the present wireless communication system will be schematically described with reference to FIG. 1.

First, the BS 10 accesses the database 50, and acquires the list of transmittable frequencies at its installation position and the maximum allowed transmission power for the frequencies.

The maximum allowed transmission power is the limit value of the power range which would not influence the primary user.

Then, the BS 10 determines the maximum transmittable power based on the maximum allowed transmission power, and notifies the coexistence manager 60 of its installation position, the list of transmittable frequencies, and information about the maximum transmittable power, and requests for the list of transmittable frequencies reconstructed by the coexistence manager 60.

The maximum transmittable power is the smaller of the maximum power that can be output by the device and the maximum allowed transmission power.

Additionally, the BS 10 may notify the coexistence manager 60 of the position information and the coexistence manager 60 may acquire the list of transmittable frequencies and the maximum allowed transmission power by making an inquiry to the database 50, and the coexistence manager 60 may select the transmittable frequency from the list, or the BS 10 may make an inquiry to the database 50 and notify the coexistence manager 60 of the position information, the list of transmittable frequencies, and the maximum transmittable power, and the coexistence manager 60 may select the transmittable frequency from the list.

The coexistence manager 60 reconstructs the list of transmittable frequencies of the BS 10 based on the list of transmittable frequencies of the BS 10, operating channel information of the other secondary use system present around the BS 10, and the like, and replies to the BS 10 with the list of transmittable frequencies.

The BS 10 selects an operating channel from the reconstructed list of transmittable frequencies, and notifies the coexistence manager 60 of its operating channel. The coexistence manager 60 thereby grasps the frequency the secondary use of which is currently being made by the wireless communication system 1.

Then, the BS 10 starts communication that uses white space with a CPE in the wireless communication system 1 by using the operating channel.

In the present system, after communication is started, the BS 10 performs communication using the frequency for entry that is stored in the BS 10 in advance, in addition to the operating channel determined from the list of transmittable frequencies from the coexistence manager 60. The frequency for entry is a frequency which is guaranteed to not influence the primary use system.

Moreover, the BS 10 performs communication by alternately switching between the operating channel and the frequency for entry on a regular basis. This operation will be described later.

Figure 2:
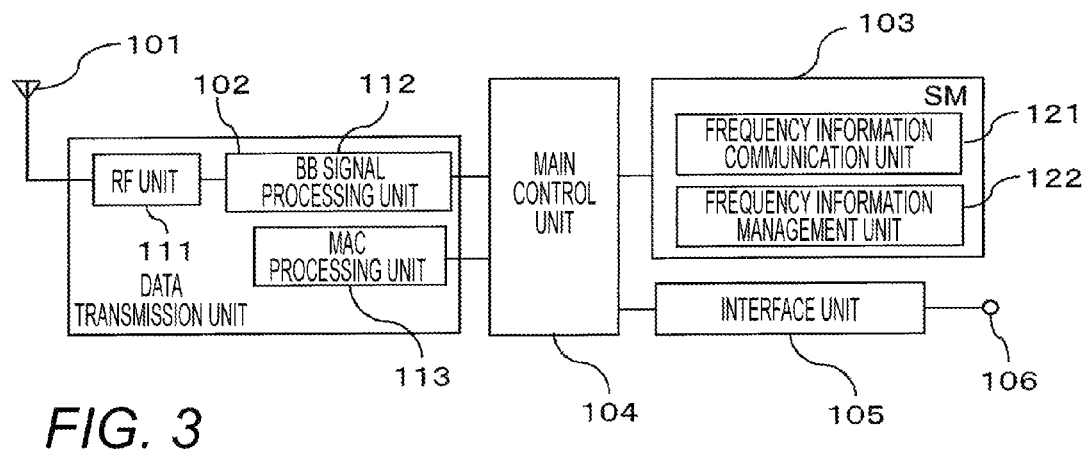
FIG. 2 is a configuration block diagram of a BS 10.

<Configuration of BS 10: FIG. 2>

Next, a configuration of the BS 10 will be described with reference to FIG. 2. FIG. 2 is a configuration block diagram of the BS 10.

As illustrated in FIG. 2, the BS 10 includes an antenna 101 for transmitting/receiving radio waves, a data transmission unit 102 for transmitting/receiving data, a spectrum manager (SM) 103 for managing the operating channel and the transmittable frequency, a main control unit 104 for controlling the entire station, an interface unit 105 as an interface to the backhaul 30 or an external device, and a terminal 106 for connecting to the backhaul or the external device.

Each structural part will be described.

The data transmission unit 102 includes an RF unit 111, a baseband (BB) signal processing unit 112, and a MAC processing unit 113.

The RF unit 111 performs processes such as frequency conversion from a baseband to a wireless frequency band, frequency conversion from a wireless frequency band to the baseband, and signal amplification.

The BB signal processing unit 112 performs an error correction coding/decoding process, a modulation/demodulation process, and the like.

The MAC processing unit 113 performs processes such as control of frequency to be used by the own station or of the data transmission/reception timing, addition of an identifier of the own station to a communication packet, and recognition of a wireless device which is a data transmission source.

The SM 103 includes a frequency information communication unit 121, and a frequency information management unit 122. Additionally, the SM 103 corresponds to the frequency management unit described in the claims.

The frequency information communication unit 121 transmits position information and the like of the own station to the coexistence manager 60, and receives the list of transmittable frequencies from the coexistence manager 60.

The frequency information management unit 122 selects an operating channel from the received list of transmittable frequencies, determines the frequency to be used by the own station, and notifies the coexistence manager 60 of the operating channel of the own station.

Furthermore, the frequency information management unit 122 stores the frequency for entry (channel for entry), and notifies, at a timing set in advance, the data transmission unit 102 via the main control unit 104 to the effect that the operating channel and the channel for entry are to be switched for each specific period.

The main control unit 104 performs determination of the operating frequency, or control such as switching between the operating frequency and the frequency for entry, and may be configured by a processor, a data storage area defined on a memory, and software, for example.

Furthermore, processes by the BB signal processing unit 122, the MAC processing unit 123, and the SM 103 may be realized by the processor of the main control unit 104 loading programs stored in a data storage device such as a hard disk or a flash memory into the memory and executing the same, for example.

Figure 3:
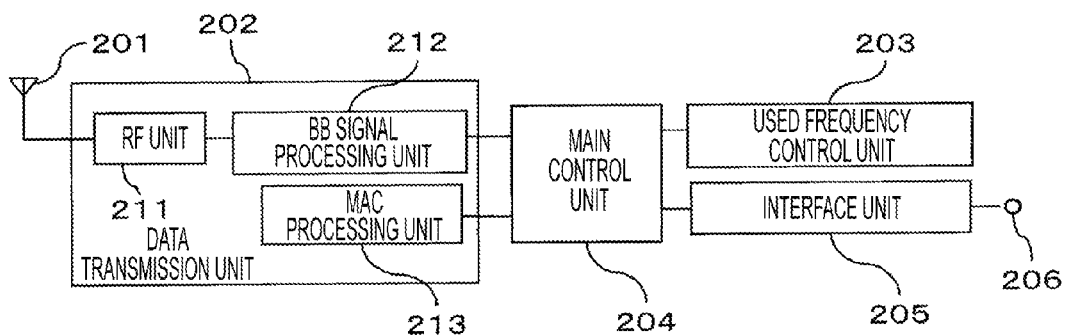
FIG. 3 is a configuration block diagram of a CPE 21.

<Configuration of CPE 21: FIG. 3>

Next, a configuration of the CPE 21, which is a terminal station, will be described with reference to FIG. 3. FIG. 3 is a configuration block diagram of the CPE 21. Additionally, the configuration of the CPE 22 is the same as that of the CPE 21, and description thereof is omitted.

As illustrated in FIG. 3, the CPE 21 includes an antenna 201 for transmitting and receiving radio waves, a data transmission unit 202 for transmitting/receiving data, a used frequency control unit 203 for controlling the frequency to be used by the own station, a main control unit 204 for controlling the entire own station, an interface unit 205 as an interface to an external line or an external device, and a terminal 206 for connecting to the external line or the external device.

Furthermore, the data transmission unit 202 includes an RF unit 211, a baseband (BB) signal processing unit 212, and a MAC processing unit 213.

The RF unit 211 performs processes such as frequency conversion from a baseband to a wireless frequency band, frequency conversion from a wireless frequency band to the baseband, and signal amplification.

The BB signal processing unit 212 performs an error correction coding/decoding process, a modulation/demodulation process, and the like.

The MAC processing unit 213 performs processes such as control of frequency channel to be used by the own station or of the data transmission/reception timing, addition of an identifier of the own station to a packet, and recognition of a wireless device which is a data transmission source.

The used frequency control unit 203 performs control such that, at the time of new communication entry when the transmittable frequency based on the position information or the like of the own station from the database 50 or the like is not yet known, only the frequency for entry for which it is guaranteed that there is no primary user is used, and performs control such that, after the transmittable frequency has become known, the operating frequency of the present system 1 which is the transmittable frequency of the own station is used.

Specifically, after the transmittable frequency has become known, the used frequency control unit 203 performs control such that communication is performed with the operating frequency and the frequency for entry being alternately switched.

The used frequency control unit 203 may store in advance the value of the frequency for entry, or as described above, may search for downlink signals from the BS 10 in a specific frequency range and determine the frequency for entry from the received frequencies.

Like the BS 10, the main control unit 204 may be configured by a processor, a data storage area defined on a memory, and software, for example. Furthermore, processes by the BB signal processing unit 212 and the MAC processing unit 213 may be realized by the processor of the main control unit 203 loading programs stored in a data storage device such as a hard disk into the memory and executing the same, for example.

Figure 4:
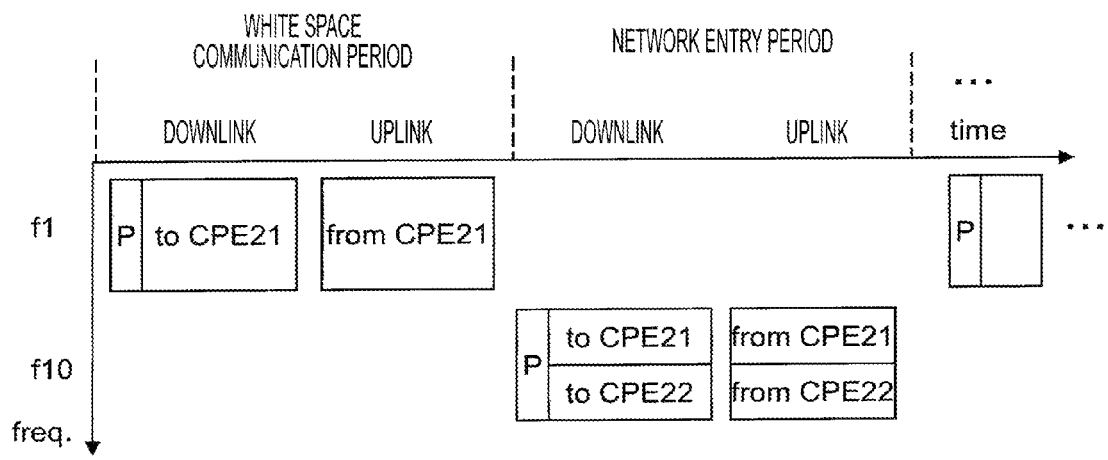
FIG. 4 is a schematic explanatory diagram illustrating a frequency switching pattern of the present system.
Figure 5:
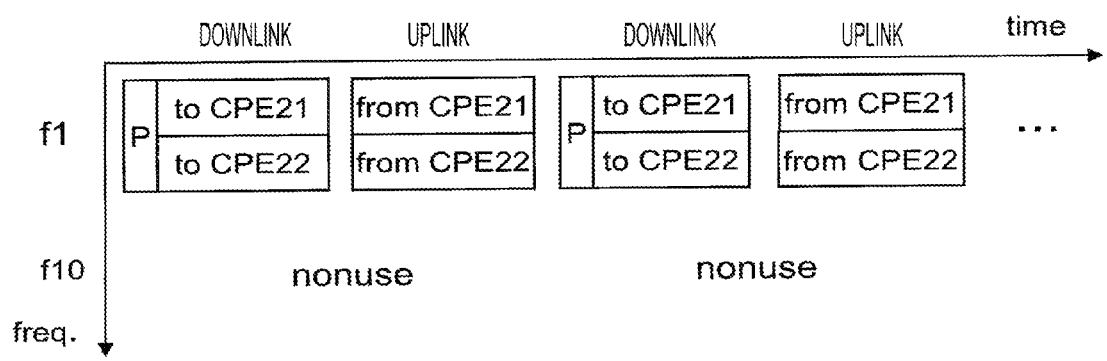
FIG. 5 is a schematic explanatory diagram illustrating a frequency use pattern of a conventional wireless communication system.

<Example Frequency Switching Pattern of Present System: FIG. 4>

Next, an example of a frequency switching pattern of the present system will be described with reference to FIG. 4. FIG. 4 is a schematic explanatory diagram illustrating a frequency switching pattern of the present system.

As described above, the BS 10 of the present system performs communication by regularly switching between the operating frequency and the frequency for entry. In this case, the operating frequency is f1, and the frequency for entry is f10.

Also, in FIG. 4, the CPEs 21 and 22 are present in the present system managed by the BS 10, and it is illustrated that the CPE 21 is already performing communication, and the CPE 22 is about to newly start communication, and it is already recognized by the CPE 21 that f1 is the transmittable frequency.

Furthermore, as illustrated in FIG. 4, in the present system, a white space communication period when the operating frequency f1 is used and a network entry period when the frequency for entry f10 is used are alternately provided.

The durations of the white space communication period and the network entry period may be arbitrarily set, and for example, may be variable depending on the number of connected CPEs or traffic, and the length of each period is given to each CPE as initial setting information.

In the white space communication period, the BS 10 performs, using the operating frequency f1, transmission/reception with the CPE 21, which already knows that f1 is the transmittable frequency.

In the white space communication period, the CPE 22 trying to newly enter communication does not perform communication with the BS 10 because it cannot use frequencies other than the frequency for entry f10.

Then, after a specific period has passed, the BS 10 switches the used frequency from f1 to f10 to reach the network entry period.

When the network entry period is reached, the CPE 21 switches the used frequency from f1 to f10, and continues the communication.

That is, because it is already recognized by the CPE 21 that both f1, which is the operating frequency, and f10, which is the frequency for entry, can be used, the CPE 21 performs transmission/reception in the white space communication period by using f1, and performs transmission/reception in the network entry period by using f10.

Also, the CPE 22 first performs communication with the BS 10 in order to acquire information about the transmittable frequency that is based on its position information, but at a time when the transmittable frequency is not known, the CPE 22 uses only the frequency for entry f10.

Accordingly, the CPE 22 performs transmission/reception with the BS 10 in the network entry period by using f10, and attempts to acquire the list of transmittable frequencies that is based on its position information.

Acquisition of the list of transmittable frequencies is sometimes not completed in one network entry period, and in such a case, communication is continued in the subsequent network entry period.

In this manner, if whether the operating frequency f1 is usable to the CPE 22 or not is not known, communication is performed by using the frequency for entry f10 transmission at which is definitely possible, and thus interference with the primary user may be prevented in advance.

Then, when a specific time has passed, the BS 10 switches the used frequency from f10 to f1 to reach the white space communication period.

In the example in FIG. 4, at this point, the CPE 22 has yet to acquire the list of transmittable frequencies that is based on its position information, and only the CPE 21 is performing communication using the operating frequency f1.

In the case where the list of transmittable frequencies that is based on the position information of the CPE 22 is acquired by the CPE 22 and f1 is included in the list, the CPE 22 is enabled to perform communication using f1 in the white space communication period.

Also, in the case where it has become clear that the CPE 22 cannot use f1, the BS 10 selects, from its list of transmittable frequencies, a frequency that can be used by both the CPEs 21 and 22, and performs communication in the white space communication period using this frequency as the operating frequency.

Switching of frequencies at the present system is performed in the above manner.

As described above, with the present system, wireless communication necessary for acquiring the list of transmittable frequencies may be performed without allocating a frequency dedicated to a control channel, and efficient secondary use of frequencies is enabled.

<Effects of Embodiment>

According to the wireless communication system of the embodiment of the present invention, the BS 10 and the CPEs 21 and 22 store, in advance, as the frequency for entry, a specific frequency which is guaranteed to be not used by primary users, the BS 10 performs communication while switching, at specific times, between the white space communication period when an operating frequency selected from the list of transmittable frequencies is used and the network entry period when the frequency for entry is used, and the CPEs 21 and 22 each perform communication by using only the frequency for entry when the transmittable frequency that is based on the position information of the own station is unknown, and after the list of transmittable frequencies that is based on the position information of the own station is acquired, by using the operating frequency in the white space communication period and the frequency for entry in the network entry period, and thus even in a case where the wireless communication system is configured by using a terminal station which cannot acquire the list of transmittable frequencies unless through the base station, the CPEs 21 and 22 about to newly enter communication use the frequency for entry which definitely does not influence the primary user until the transmittable frequency that is based on their position information is grasped, and are prevented from performing communication at an operating frequency for which it is not known whether transmission is possible, and effective use of frequencies may be performed, and also interference with primary users may be prevented.

Additionally, in the present embodiment, at the time of determining the frequency to be operated by the BS 10, the frequency is selected from the list of transmittable frequencies acquired from the coexistence manager 60, but the frequency may alternatively be selected from the list of transmittable frequencies acquired from the database 50.

Furthermore, in the present embodiment, the BS 10 performs transmission/reception of radio waves in the network entry period at f10, but this network entry period may be made the same as a period called "Quiet Period" when emission of radio waves by a secondary user is stopped to detect the presence of a primary user by sensing.

Moreover, in the present embodiment, the BS 10 performs transmission/reception of radio waves in the network entry period at f10, but a Half-FDD (Frequency Division Duplex) system where f1 is used for transmission and f10 is used for reception is also possible. In this case, the CPE 22 receives radio waves at f1, and transmits radio waves at f10.

Still further, in the present embodiment, the BS 10 uses frequency of one channel, but it may alternatively be a base station with multiple channels including a plurality of data transmission units, and a specific data transmission unit may be in the network entry period at all times.

Furthermore, the present wireless communication system is particularly suitable for a wireless communication system defined by IEEE 802.22, but is not limited to such.

The present invention is suitable for a wireless communication system that is capable of efficiently making secondary use of a frequency without interfering with a primary user.

REFERENCE SIGNS LIST

1 Wireless communication system
2 Existing system
3 Another secondary use system
10 Base station (BS)
21, 22 Terminal station (CPE)
30 Backhaul
40 Internet
50 Database (DB)
60 Coexistence manager
70 Transmitting station
80 Receiving station
101 Antenna
102 Data transmission unit
103 Spectrum manager (SM)
104, 204 Main control unit
105, 205 Interface unit
106 Terminal
111, 211 RF unit
112, 212 Baseband signal processing unit
113, 213 MAC processing unit
121 Frequency information communication unit
122 Frequency information management unit
203 Used frequency control unit FIG. 1
1 WIRELESS COMMUNICATION SYSTEM (SYSTEM USING WHITE SPACE)
2 EXISTING SYSTEM
3 ANOTHER SECONDARY USE SYSTEM FIG. 2
102 DATA TRANSMISSION UNIT
104 MAIN CONTROL UNIT
105 INTERFACE UNIT
111 RF UNIT
112 BB SIGNAL PROCESSING UNIT
113 MAC PROCESSING UNIT
121 FREQUENCY INFORMATION COMMUNICATION UNIT
122 FREQUENCY INFORMATION MANAGEMENT UNIT FIG. 3
202 DATA TRANSMISSION UNIT
203 USED FREQUENCY CONTROL UNIT
204 MAIN CONTROL UNIT
205 INTERFACE UNIT
211 RF UNIT
212 BB SIGNAL PROCESSING UNIT
213 MAC PROCESSING UNIT FIG. 4
P PREAMBLE, FRAME HEADER
  WHITE SPACE COMMUNICATION PERIOD
  NETWORK ENTRY PERIOD
  DOWNLINK
  UPLINK

FIG. 5
P PREAMBLE, FRAME HEADER
  DOWNLINK
  UPLINK

What is claimed is:

1. A wireless communication system for performing wireless communication between a base station and a terminal station by using white space, comprising:
   a base station including;
      a first data transmission unit for transmitting/receiving data over a radio, a spectrum manager, and
a first main control unit for controlling the base station; and
a terminal station including:
a second data transmission unit for transmitting/receiving data over the radio,
a used frequency control unit for controlling radio frequency to be used by the terminal station, and
a second main control unit for controlling the terminal station;
wherein the base station and the terminal station store information that includes a specific frequency that does not interfere with a primary user;
wherein the first main control unit causes the base station to perform communication based on a communication standard while repeating a first period and a second period,
wherein the first period includes the communication being performed at an operating frequency selected from a white space, and
wherein the second period that includes the communication being performed at the specific frequency; and
wherein the used frequency control unit selects, at a time of entry into the base station, the specific frequency instead of the operating frequency that is not confirmed as a transmittable frequency defined by a TVWS database or a coexistence manager located outside of the terminal station depending on a position of the terminal station, and
wherein the used frequency control unit selects the operating frequency after a list of transmittable frequency has been acquired via the base station during the second period and the operating frequency has been confirmed as a transmittable frequency for the terminal station.

2. The wireless communication system of claim 1, wherein the spectrum manager includes:
a frequency information communication unit that transmits information of a position of the base station to the TVWS database or the coexistence manager and receives a list of transmittable frequencies for the base station, and
a frequency management unit that stores information including the operating frequency amongst the white space and information about the specific frequency that does not interfere with the primary user;
wherein the first data transmission unit and the second data transmission unit respectively comprises;
an RF unit that performs processes including:
frequency conversion from a baseband to a radio frequency band, and signal amplification;
a signal processing unit that performs an error coding/decoding process and a modulation/demodulation process;
A MAC processing unit that performs processes including:
controlling a frequency to be used by a respective station,
timing the data transmission/reception,
adding an identifier of respective station to a communication packet, and
recognizing a wireless device from which a data was transmitted, according to the communication standard using Time Division Duplex (TDD) or half-Frequency Division Duplex (FDD) scheme; and
wherein the first period and the second period are determined and switched in a unit of frame used in the TDD or half-FDD scheme.

3. The wireless communication system of claim 2, wherein the second period is set as a quiet period in which emission of radio by any secondary user is stopped to detect a presence of the primary user.

4. The wireless communication system of claim 2, wherein in response to an other terminal station being unable to use the operating frequency, the base station selects from the list of the plurality of transmittable frequencies, a frequency that can be used by both the terminal station and the other terminal station to communicate in the white space communication period using the frequency as the operating frequency.

5. A wireless communication method for performing wireless communication between a base station and a terminal station by using white space, comprising:
selecting an operating frequency from a white space;
performing communication based on a communication standard while repeating a first period and a second period,
wherein the first period includes communication being performed at the operating frequency selected from the white space, and
wherein the second period includes the communication being performed at a specific frequency that does not interfere with a primary user;
selecting, at a time of entry into a base station, the specific frequency instead of the operating frequency that is not confirmed as a transmittable frequency defined by a TVWS database or a coexistence manager located outside of a terminal station depending on a position of the terminal station; and
selecting the operating frequency after a list of transmittable frequency has been acquired via the base station during the second period and the operating frequency has been confirmed as a transmittable frequency for the terminal station.

* * * * *